United States Patent [19]

Hodzic et al.

[11] 4,118,276
[45] Oct. 3, 1978

[54] CONDUIT SYSTEM FOR GASES OF HIGH TEMPERATURE AND HIGH PRESSURE

[75] Inventors: Alija Hodzic; Dirk Haferkamp, both of Mannheim; Heinrich Stach, Ilvesheim; Eike Päetz, Ludwigshafen, all of Fed. Rep. of Germany

[73] Assignee: Hochtemperatur-Reaktorbau GmbH, Cologne, Fed. Rep. of Germany

[21] Appl. No.: 805,510

[22] Filed: Jun. 10, 1977

Related U.S. Application Data

[63] Continuation of Ser. No. 605,000, Aug. 15, 1975, abandoned.

[30] Foreign Application Priority Data

Aug. 16, 1974 [DE] Fed. Rep. of Germany ....... 2439224

[51] Int. Cl.² .............................................. G21C 3/56
[52] U.S. Cl. ........................................ 176/60; 176/87
[58] Field of Search .................................. 176/58–60, 176/65, 87; 285/47, 133 R

[56] References Cited

U.S. PATENT DOCUMENTS

| | | |
|---|---|---|
| 3,127,323 | 3/1964 | Bray et al. ............................. 176/59 |
| 3,249,507 | 5/1966 | Gowdoin et al. ....................... 176/59 |
| 3,357,892 | 12/1967 | Schmidt ................................. 176/65 |
| 3,695,636 | 10/1972 | Graves .................................. 285/47 |
| 3,818,935 | 6/1974 | Karker et al. ......................... 176/65 |
| 3,909,351 | 9/1975 | Tilliette ................................ 176/87 |
| 4,025,387 | 5/1977 | Haferkamp et al. ................... 176/60 |

*Primary Examiner*—Samuel W. Engle
*Assistant Examiner*—S. A. Cangialosi
*Attorney, Agent, or Firm*—Bacon & Thomas

[57] ABSTRACT

Disclosed is a high temperature power plant construction, preferably a nuclear power plant, including a plurality of plant components comprising at least one gas-cooled high temperature source, contained in a sealed vessel, and a transport system, connecting the plant components, for gas of high temperature and high pressure, the improvement which comprises the gas transport system comprising at least one internally insulated hot gas transport conduit formed from a plurality of separate sections, a pressure jacket surrounding said hot gas transport conduit, at least one closed channel formed inside of the vessel for transporting a cool gas stream, and means for freely and removably mounting the hot gas transport conduit coaxially inside of the cool gas transport channel.

11 Claims, 4 Drawing Figures

CONDUIT SYSTEM FOR GASES OF HIGH TEMPERATURE AND HIGH PRESSURE

This is a continuation, of application Ser. No. 605,000, filed Aug. 15, 1975 now abandoned.

BACKGROUND OF THE INVENTION

1. Field of the Invention

The present invention relates to a conduit system for the transport of gases of high temperature and high pressure during travel between a plurality of component units of a power station arranged inside a pressure vessel, and more particularly to such a conduit system which is adapted for use in conjunction with the operating units of the main circuit of a gas-cooled nuclear reactor station.

2. Description of the Prior Art

In installations of the aforementioned kind, the gas conduit system has for its purpose to guide the heated, highly pressurized gas which leaves the reactor core to a turbine or to heat exchanging process units, further to distribute the gas to the various other operating units of the circuit, to collect the gas as it leaves these units, and to lastly return it to the reactor core. In view of the fact that even insignificant defects in a nuclear reactor power station may lead to radioactive contamination or irradiation of the surrounding areas of the reactor, all component parts of such an installation are subject to the most stringent requirements concerning their operating safety. For this reason, it is necessary to construct the entire installation, including the gas conduit system, in such a way that no radioactively contaminated gas can escape from the pressure vessel.

From German Offenlegungsschrift No. 2,028,736 there is known a nuclear power station having a closed gas-cooled circuit and featuring, inside a concrete pressure vessel, a high-temperature reactor, a gas turbine unit with compressor, heat exchanging units, as well as the gas conduits which link together the machines, the heat exchanging units, and the reactor core. The machines, heat exchanging units, and the conduits are in this case accommodated inside a machine block of pre-stressed concrete which is separate from the concrete pressure vessel. The only connections between the machine block and the concrete pressure vessel are an explosion- and radiation-proof gas supply conduit and gas return conduit. These two conduits may be constituted of a double-wall steel shell, or they may be jacketed with concrete walls. Other gas conduits, which link the units arranged inside the machine block, are constructed so that they serve as so-called lost forms, with concrete being cast around them at the place of final installation. This method of constructing the gas conduit system has the shortcoming that it precludes inspection and maintenance access to the gas conduits at a later date; it also makes any replacement of defective gas conduit components impossible. A further consideration which weighs against this type of installation is the fact that the elevated gas temperatures which are characteristic of a high-temperature reactor lead to considerable heat stress in the surrounding concrete.

In German Auslegeschrift No. 1,614,610 is likewise disclosed a nuclear power station featuring a concrete pressure vessel, and an associated pressure-tight machine chamber enclosing the turbine, the compressor, and the heat exchanging process units. The entire installation may alternatively also be arranged inside a single concrete structure enclosing two self-contained, pressure-proof chambers, separated from each other by means of a partition wall. In this partition wall are arranged wall conduits for the working gas which are installed directly in the concrete of the partition wall, in the form of insulated concrete ducts covered by a gas-tight steel skin. These conduits, too, are subject to the earlier-mentioned shortcomings: they are unaccessible for servicing or replacement, and the concrete is again subjected to elevated temperature stress, especially around the conduit which transports the heated working gas.

SUMMARY OF THE INVENTION

Building upon the aforementioned state of the prior art, the present invention is pursuing the objective of devising an improved conduit system for gases of high temperature and high pressure which, while satisfying all the operational requirements of such a system, also lends itself to the performance of servicing and external repairs, as well as to the replacement of defective sections of the conduit system.

These and other objects have been accomplished according to the present invention by providing a high temperature power plant construction, preferably a nuclear power plant, including a plurality of plant components comprising at least one gas-cooled high temperature source, contained in a sealed vessel, and a transport system, connecting said plant components, for gas of high temperature and high pressure. The improvement provided by the invention comprises said gas transport system comprising at least one internally insulated hot gas transport conduit formed from a plurality of separate sections, a pressure jacket surrounding said hot gas transport conduit, at least one closed channel formed inside of said vessel for transporting a cool gas stream, and means for freely and removably mounting said hot gas transport conduit coaxially inside of said cool gas transport channel.

The present invention provides that the desired transport of the hot gases be obtained by means of a plurality of internally insulated conduits, assembled of several component sections which are freely mounted inside the pressure vessel, so as to be removable therefrom, and which are equipped with a pressure jacket. It provides further that the pressure jackets are cooled on their other side by a stream of cold gas flowing inside large channels which coaxially surround the gas conduits and which have walls of steel or concrete.

From conventional power station technology, it is known to use freely installed conduits for such gases as waste steam, waste gas of furnaces, natural gas, and the like. Similarly, open circuit as well as closed circuit gas turbine installations frequently feature gas conduits having an inside insulation. Yet, the subject matter of the present invention goes beyond this known prior art, representing a combination of new achievements in the art with known techniques, a combination which heretofore has not been employed in the construction of heavy duty conduit systems.

A preferred embodiment of the present invention features a gas conduit system for a nuclear power installation whose component units, which are to be linked together by the system, are arranged inside a pressure vessel of pre-stressed concrete surrounding a reactor core; which may be a high-temperature reactor, for example. The component units, i.e., the main circuit components of the reactor consisting of a turbine, a compressor, and heat exchanging units, are accommodated partly in vertical bores or pods and partly in horizontal pods, these bores or pods being arranged in the walls of the concrete pressure vessel, for example, in the manner described in the German Offenlegungsschrift No. 2,241,426. The channels which, according to the present invention, run coaxially with the gas conduits, form similar vertical or horizontal pods inside the wall of the concrete pressure vessel. These channel walls are preferably clad with a liner. The hot gas travelling from the reactor to the turbine, and the gas which returns to the reactor following its reheating in the recuperators to a temperature of approximately 450° C., is confined inside the gas conduits, while the pods in the concrete structure which form the surrounding coaxial channels receive a flow of gas which has been cooled in the recuperators and in the pre-coolers, thereby preventing the establishment of unacceptable heat levels in the concrete as well as in the conduit system. Using a similar arrangement, the gas which exits from the turbine and which still has a temperature of approximately 500° C., is likewise guided by means of a conduit system as suggested by the present invention, flowing to the recuperators, which it contacts from the outside. The straight-line guidance of the gases inside horizontal and vertical bores or pods renders the gas conduits readily accessible for inspection and servicing, and the various pods inside the pressure vessel wall are equipped with removable covers. This makes it possible to replace defective components of the conduit system without difficulty. It also makes it possible to perform on-the-spot repairs. The overall result of the transport of the hot and warm gas streams inside the insulated, freely mounted gas conduits, equipped with pressure jackets, and the flowing of cold circuit gas along the outside of the pressure jackets through the bores or pods arranged inside the concrete is a gas conduit system which is not only economically advantageous, but which also offers very favorable features from a safety standpoint, features which are especially desirable for the gas conduit system of a nuclear power station arranged inside a pressure vessel of pre-stressed concrete.

Such a nuclear power station may, for instance, feature a high-temperature reactor with which is associated, in direct connection, a helium turbine. On the other hand, the gas conduit system of the invention may also be used in conjunction with nuclear power stations featuring a two-circuit system, or alternately, with process heat installations, as well as in connection with so-called "fast breeder" reactors. It does not matter, for such a gas conduit system, whether the main circuit component units are integrated entirely or only partially inside the pressure vessel. Neither is the invention limited to gas conduit systems where the operating units which are to be linked are installed inside a pressure vessel of pre-stressed concrete; the units may equally well be installed inside a pre-stressed metal pressure vessel.

In the gas conduit system of the invention, the conduits a are laid out to have several fixed points, or anchor points, in the coaxial channels to which the conduits are anchored and from which they are conveniently detachable by means of appropriate mounting elements. It is thus possible to remove defective conduit components without difficulty, even from the outside, by using manipulators, and to replace them with new components.

The anchor points of the system are preferably arranged at the connection ends of the straight conduit sections, in the case of a nuclear reactor installation, for example, at the connections to the reactor and to the turbine, respectively. At these points, the conduits are attached to the liner of the coaxially extending pod in the concrete of the pressure vessel.

It has also been found to be very advantageous to utilize as connecting elements between the conduit sections and between the corresponding liners special multi-sectional clamping rings. Such a multi-sectional clamping ring is used, for example, to attach the hot-gas conduit section to the liner at the anchor point adjacent to the reactor.

The conduits for the hot, highly pressurized gas undergo certain movements, as a result of heat expansion and other compensatory shifting. In order to accommodate such movements, the conduit sections between the anchor points are equipped with special compensation elements. These compensation elements accommodate sizable radial and axial shifting between the conduit sections. Depending upon the available space and the specific use of a particular conduit, these compensation elements may be either axial-shift connections having spring-loaded sealing segments, or they may be joint compensators, or axial compensators.

The connections between the several conduit sections may likewise employ multi-sectional clamping rings which are readily removable and which thus facilitate the assembly and disassembly of the conduit system. On the other hand, it is also possible to use axial-shift connections with spring-loaded sealing segments at the joints between the conduit sections, which then also serve the purpose of compensating for the heat expansion adjustments and other compensatory movements.

In order to absorb forces resulting from vibrations or earthquakes, or from the reaction forces generated inside the conduit portions, the latter are further equipped, at several points along their length, with damping elements, spaced angularly around their circumference. These damping elements may be spring-action supporting legs which provide the necessary radial support for the conduit sections.

Further objects, special features and advantages of the invention will become apparent from the detailed description following below, when taken together with the accompanying drawings which illustrate, by way of example, a preferred embodiment of the invention.

DESCRIPTION OF PREFERRED EMBODIMENTS

Figure 1:
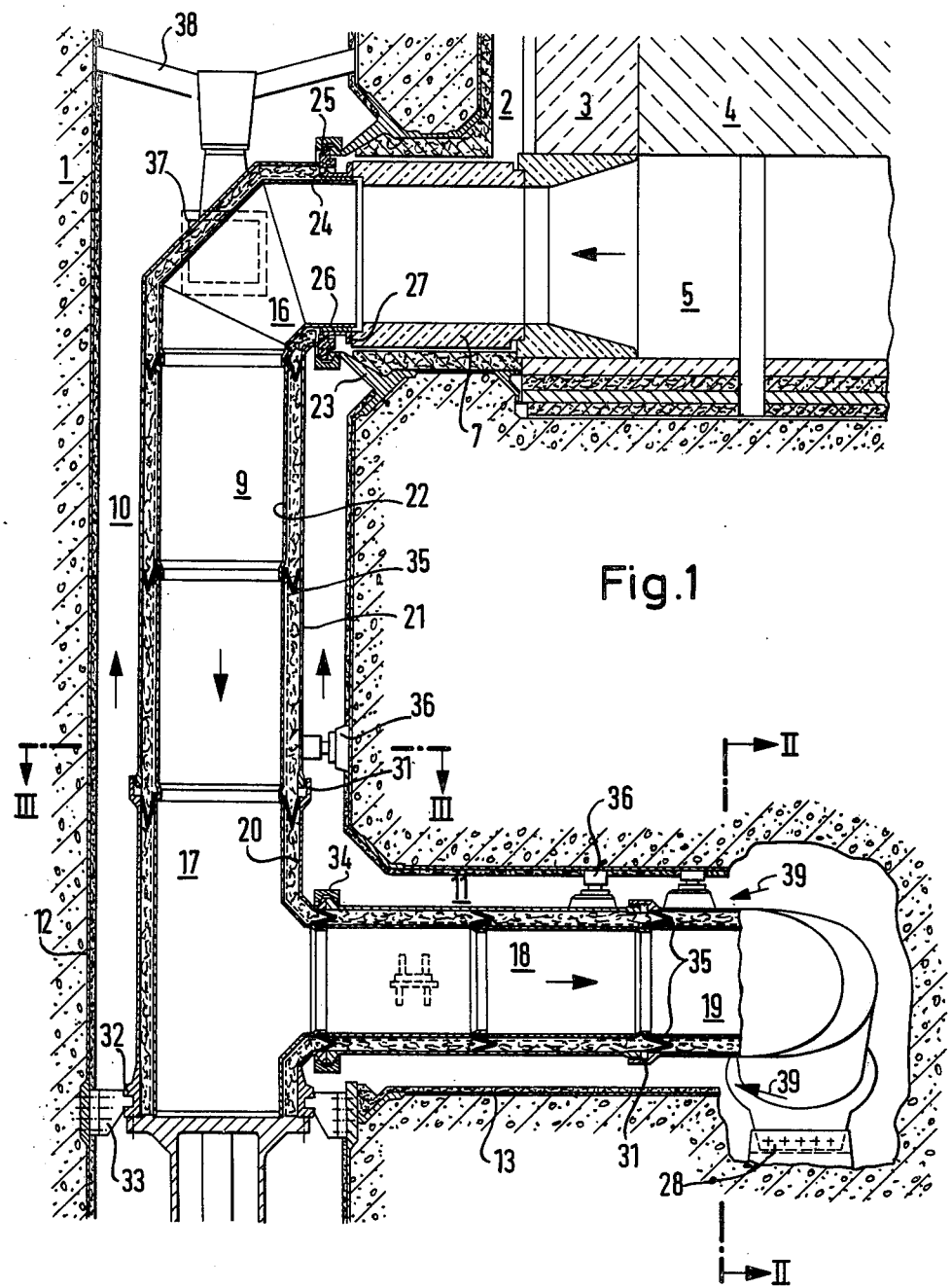
FIG. 1 shows, in a longitudinal cross section, the hot-gas conduit of a high temperature reactor power station, leading from the nuclear reactor to the helium turbine and representing an embodiment of the invention.
Figure 2:
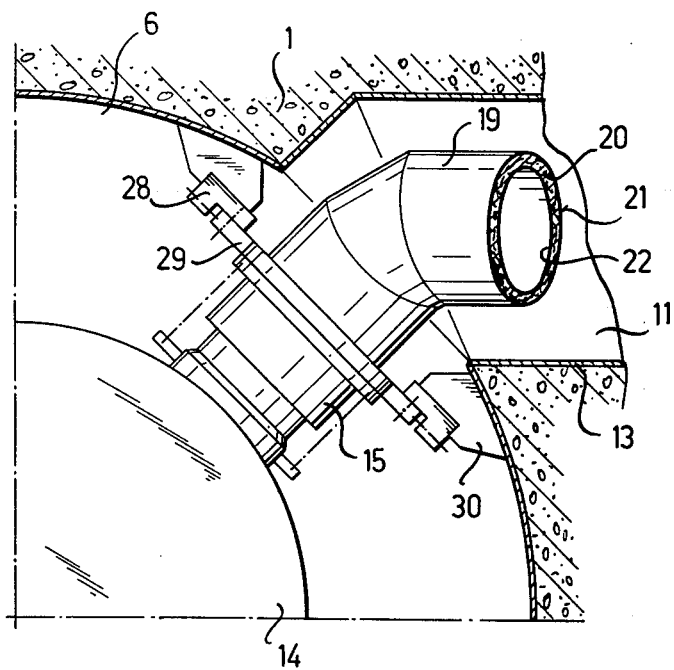
FIG. 2 is a cross section along line II—II of FIG. 1.

Referring to FIG. 1, there is shown a portion of a cylindrical pressure vessel 1 of pre-stressed concrete which accommodates a high temperature reactor inside a cavern 2. The reactor is a graphite-moderated, helium-cooled ball pile reactor of which only a portion of the reflector mantle 3 and of the bottom reflector 4 is seen and which has arranged adjacent to it a hot-gas collecting chamber. The other components of the main circuit, i.e., the turbine, the compressor, and the heat exchanging units, are likewise arranged inside cavities of the pressure vessel 1 which are lined with steel liners. FIG. 2 shows a portion of the cavity, arranged as a horizontal pod 6, inside of which the turbine 14 and the compressor are mounted. Four radially oriented exit pipes 7 and six likewise radially oriented entry pipes 8 (see FIG. 4) connect the high temperature reactor with the other components of the main circuit.

The four exit pipes 7 lead from the hot-gas collecting chamber 5 of the reactor to corresponding hot-gas conduits 9, of which one is shown in FIG. 1. This conduit is freely mounted in part inside a vertical pod 10 and in part inside a horizontal pod 11, both being arranged inside the wall of the pressure vessel 1 of the prestressed concrete. The two bores or pods 10 and 11 are clad with steel liners 12 and 13, respectively. Each of the four hot-gas conduits 9 leads to a turbine feed pipe 15, which is visible in FIG. 2, with only one of the circuit lines being shown. Each one of the hot-gas conduits 9 has an interior insulation layer 20 surrounded by a pressure jacket 21. The interior insulation layer 20 consists of a fiber or metal insulation, applied in several successive layers, and is attached to the pressure jacket 21 in longitudinal sections. For purposes of quick depressurization, the insulating layers are covered with perforated sheet metal sections (not shown). Inwardly adjacent to these perforated sheet metal sections is arranged an inner gas transport pipe type 22, suspended elastically in longitudinal sections against the pressure jacket 21.

Each one of the hot gas conduits 9 of this embodiment of the invention consists of four conduit sections, shown at 16, 17, 18, and 19, and so arranged that their installation and removal from the pressure vessel 1 can be accomplished without difficulty. If necessary, they are therefore readily interchangeable with replacement sections. The straight-line arrangement of the hot gas conduits 9 provides for convenient access to the conduits for purposes of inspection and servicing.

Each hot gas conduit 9 has three anchor points, arranged in each case at the junctions of straight conduit sections. The first anchor point 23 is associated with the joint of the conduit section 16 to the reactor. At this anchor point, the first section 16 of the hot gas conduit 9, which includes an elbow portion, is fixedly connected to the liner 12 of the vertical pod 10 by means of a three-section clamping ring 24. This clamping ring 24 can be released or clamped by remote operation. The special clamping ring is designed so that it has tapered flanks with which it engages the parts to be connected — in this case, the conduit section 16 and the liner 12 — thereby both centering and axially clamping these parts so as to create a tight connection. The reactor cavern 2 can be sealed completely tight against the vertical pod 10 by means of an additional graphite seal 25, while a slidable segmented seal 26, mounted on the seal carrier 27, provides a tight separation between the reactor cavern 2 and the interior insulation 20 and the reactor exit, respectively.

The second anchor point 28 of the hot gas conduit 9 is arranged in the region of the turbine tunnel 6, at the end of the conduit section 19, which is again an elbow section and connects the hot gas conduit 9 to the feed pipe 15 of the turbine 14 (see FIG. 2). A flange 29 attached to the conduit section 19 is fixedly bolted to a counter-flange 28 of a supporting structure 30 which, in turn, is welded to the steel liner of the turbine tunnel 6. This arrangement has the advantage that the gas turbine 14 is thus insulated from any additional movements or stresses in the gas conduit system. The connections between the four hot gas conduits and the turbine are in the form of sliding connections, including a clamping mechanism which is remotely releasable from the outside.

To the conduit section 19 is joined a horizontal conduit section 18, the connection between the two sections being again established by means of a sliding connection 31 with spring-loaded sealing segments which assure a reliably sealed joint. This sort of sliding connection readily accommodates any relative movements between the various conduit sections, due to heat expansion. It also compensates for other shifts of considerable magnitude, both in the axial and the radial direction, if necessary. Radial shifting may result from the position of the second anchor point at the turbine entry side of the elbow 19 and from the differently oriented position of the connecting pipe at the reactor connection in relation to the joint for the horizontal conduit section.

The third anchor point 32 for the hot gas conduit 9 is arranged at the lower extremity of the conduit section 17. This anchor point is obtained by means of a plurality of wedge plates 33 engaging the conduit section 17 so as to position the latter. The connection between the two vertical conduit sections 16 and 17 is again obtained by means of the earlier described sliding connection 31, which again serves as a means to compensate for longitudinal heat expansion. At the joint between the vertical conduit section 17 and the horizontal conduit section 18 is arranged a three-section clamping ring 34. This clamping ring allows for a quick and convenient separation of the horizontal section from the vertical section, thereby greatly facilitating the assembly and disassembly of the hot gas conduit 9.

Figure 3:
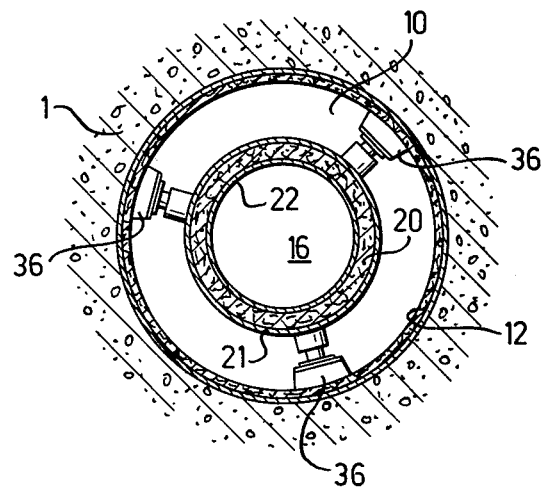
FIG. 3 is a cross section along line III—III of FIG. 1.

The axial shifting connection 31 operates in accordance with the sealing principle of a piston ring. Near this shifting connection, as well as on other places along the hot gas conduit 9 are arranged a number of damper elements 35, spaced around the circumference of the conduit. These damper elements serve to absorb vibration forces and other reaction forces acting on the hot gas conduit 9. For lateral support of the hot gas conduit 9 are further provided, at several places, along the conduit, support legs 36 mounted on the liner 12 and 13, three of each being regularly spaced around the particular conduit section. The arrangement of these support legs is shown in detail in FIG. 3.

A further safety feature is provided in connection with the conduit section 16 in the upper portion of the vertical pod 10, where a safety abutment 37 is arranged above the conduit section 16 and welded to the liner 12. Its purpose is to prevent the upward ejection of the vertical conduit section 16, should the reactor connection accidentally break. The supporting legs 38 also absorb any reaction forces of the conduit section 16 and 17.

As described previously, the heated gas, which may be helium, for example, is led to the turbine feed pipes 15 via four reactor exit pipes and four hot gas conduits 9 after exiting from the reactor. This gas has a temperature of 850° C. and a pressure of 60 bar, as it leaves the hot gas collecting chamber 5. Following expansion in the turbine 14, it flows through the remaining circuit component units, which may include, for example, six recuperators, six pre-coolers, a two-stage compressor, and two intermediate coolers. All these heat-exchanging units are mounted inside vertical pods of the pressure vessel. The gas first enters the recuperators, flowing past their outer surfaces, whereupon it enters the pre-coolers inside of which it is cooled to the lowest circuit temperature, before it enters the compressor. There, the gas is compressed to its highest circuit pressure of 64 bar, reaching a temperature of 125° C. This pressurized cool gas now returns to the recuperators, where it is distributed to the various pipe clusters of the recuperator. In this connection, the present invention suggests that the return flow of this cooled gas to the recuperators be guided coaxially to the hot gas conduit 9, whereby the cooled gas flows in reverse direction to the hot gas coming from the reactor. Thus, the cooled gas enters at the conduit end portion designated by the arrows 39, flowing through the horizontal pod 11 into the vertical pod 10, thereby cooling the hot gas conduit 9 as well as the liners 12 and 13 and thus protecting the surrounding concrete against undesirable heat buildup.

Figure 4:
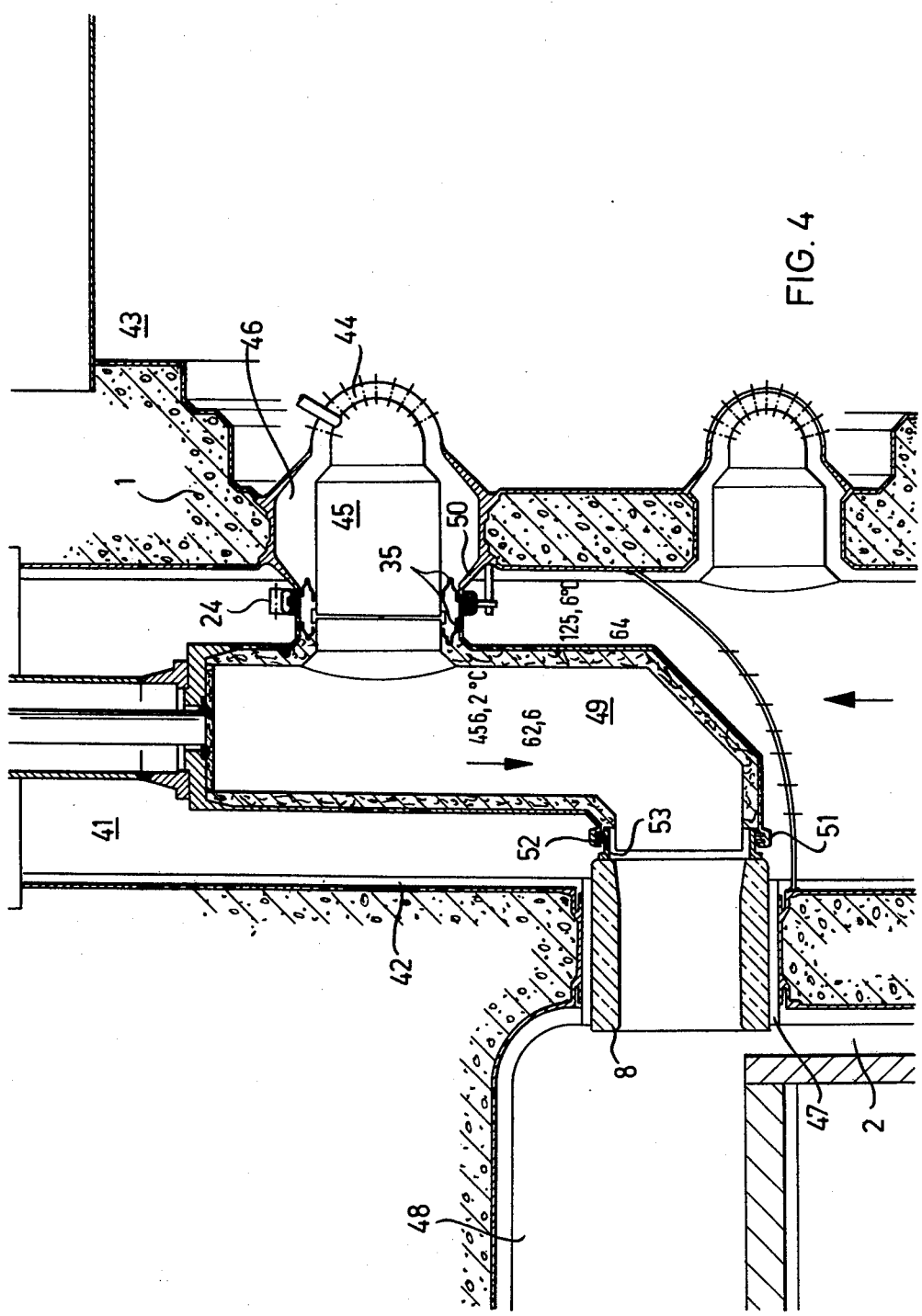
FIG. 4 shows another gas conduit of the same nuclear reactor installation, leading from the recuperator to the reactor.

FIG. 4 illustrates a second application of the novel gas conduit system of the invention, the system being used in conjunction with the return flow of the gas to the reactor from the recuperators, where it has now been pre-heated to 456° C. In the wall of the pressure vessel 1 is again arranged a vertical pod 41 clad with a steel liner 42. A second vertical pod 43 is shown only partially; in it are mounted six recuperators of which only the collecting head 44 is shown in the drawing. The collecting head 44 leads to a connecting pipe 45 arranged inside a horizontal wall passage 46. Inside a second wall passage 47 is mounted one of the six reactor entry pipes 8 leading to the cold gas collecting chamber 48.

The return travel of the gas from the recuperator to the chamber 48 takes place inside a warm-gas conduit 49 consisting of a single conduit element with an interior insulation 20 similar to that of the hot-gas conduit 9 and a pressure jacket 21. The inner pipe 22 is again elastically suspended on the pressure jacket 21.

The warm-gas conduit 49 has a single anchor point 50 arranged at the connection between the warm-gas conduit 49 and the connecting pipe 45 to the recuperator. A three-section clamping ring 24 fixedly connects the warm-gas conduit 49 to the liner 42. The connection between the reactor entry pipe 8 and the warm-gas conduit 49 is accomplished by means of a sliding-seal connection 52 of the piston-ring-type, with a supporting flange 53 bolted to the reactor entry pipe 8 carrying the connection 52. This sliding connection accommodates the heat expansion movements of the warm-gas conduit 49 and of the reactor entry pipe 8, which is made of graphite.

In the vicinity of the three-section clamping ring 24 are further arranged several damping elements 35, spaced around the circumference of the conduit. These damping elements are mounted in part on the warm-gas conduit 49 and in part on the connecting pipe 45. As in the case of the hot-gas conduit 9, the damping elements 45 have as their purpose to support the conduit and to absorb reaction forces acting on the conduit, as well as vibration and earthquake forces which might affect the installation.

As mentioned earlier, the return flow of the cooled gas from the compressor to the recuperators takes place coaxially to the hot-gas conduits 9. However, because the described nuclear reactor installation has only four hot-gas conduits 9 but six recuperators, two additional gas conduits are necessary in order to supply all six recuperators with cooled high-pressure gas. This is accomplished by means of two vertical pods of which only the pod 41 in FIG. 4 is shown. Inside these pods, and inside the four pods 10 of FIG. 1 – in their upper portion which is not shown in the drawing – are freely mounted the six warm-gas conduits 49. While reheated gas, at 456° C., returns from the recuperator to the cold-gas chamber 48 of the reactor, cold compressed gas flows from the compressor through the surrounding space inside the pods 10 and 49 in reverse direction to the returning gas, thereby surrounding the warm-gas conduit 49 with relatively cool gas. The cold pressurized gas then enters distributor heads of the recuperators inside of which it is distributed to the pipe clusters of the latter, flowing through the pipes in counter-current flow to the hot low-pressure gas coming from the turbines. The reheated gas leaves the pipes of the recuperators through the collecting heads 44, from where it enters the connecting pipes 45 to return to the reactor, via the warm-gas conduits 49.

It should be understood, of course, that the foregoing disclosure describes only a preferred embodiment of the invention and that it is intended to cover all obvious changes and modifications comprised within the scope of the appended claims.

What is claimed is:

1. In a high temperature power plant construction including a plurality of plant components comprising at least one gas-cooled nuclear reactor, contained in a pre-stressed concrete pressure vessel surrounding the reactor core, and a transport system for gas of high temperature and high pressure, connecting said plant components and being contained in said prestressed concrete pressure vessel, the improvement which comprises said gas transport system comprising a plurality of internally insulated hot gas transport conduits formed from a plurality of separate sections, means for flow connecting said conduits, a pressure jacket surrounding each of said hot gas transport conduits, a corresponding plurality of closed channels comprising bores contained within the wall of said pre-stressed concrete vessel and lined with steel or concrete, said closed channels being formed for transporting a cool gas stream, and means for removably mounting said hot gas transport conduits coaxially inside of said cool gas transport channels whereby said hot gas transport conduits are removably mounted at a plurality of intervals within said channels.

2. The power plant construction as defined by claim 1, wherein said mounting means comprise a plurality of detachable attachment elements spaced along said hot gas transport conduit.

3. The power plant construction as defined by claim 2, wherein said attachment elements are located at the connection ends of each of said separate sections which is straight, and said attachment elements attach to the lining of said bore.

4. The power plant construction as defined by claim 3, wherein each of said attachment elements comprises a plural-section clamping ring.

5. The power plant construction as defined in claim 2, further comprising means for compensating for dimensional changes between said spaced attachment elements.

6. The power plant construction as defined by claim 5, wherein said compensating means comprises a sliding connection between conduit sections, said connection having spring-loaded sealing members.

7. The power plant construction as defined by claim 5, wherein said compensating means comprises means for compensating for radial displacement.

8. The power plant construction as defined in claim 5, wherein a plurality of said compensating means are employed and at least a portion thereof comprise means for compensating for axial displacement.

9. The power plant construction as defined by claim 1, wherein said conduit sections are connected together by easily disengageable plural-section clamping rings.

10. The power plant construction as defined by claim 1, wherein the points of connection of said conduit sections comprise sliding connections having spring-loaded sealing members, whereby thermal expansion is compensated for simultaneously.

11. The power plant construction as defined by claim 1, further comprising means positioned at several locations along said conduit for damping movement of said conduit, said damping means being distributed around the circumference of said conduit.

* * * * *